Nov. 13, 1945.   F. MARTINDELL   2,388,754
MACHINE FOR WELDING
Filed July 10, 1942   3 Sheets-Sheet 1

INVENTOR.
F. MARTINDELL
BY Harry L. Dift
ATTORNEY

Nov. 13, 1945.    F. MARTINDELL    2,388,754
MACHINE FOR WELDING
Filed July 10, 1942    3 Sheets-Sheet 2

INVENTOR.
F. MARTINDELL
BY Harry L. Swift
ATTORNEY

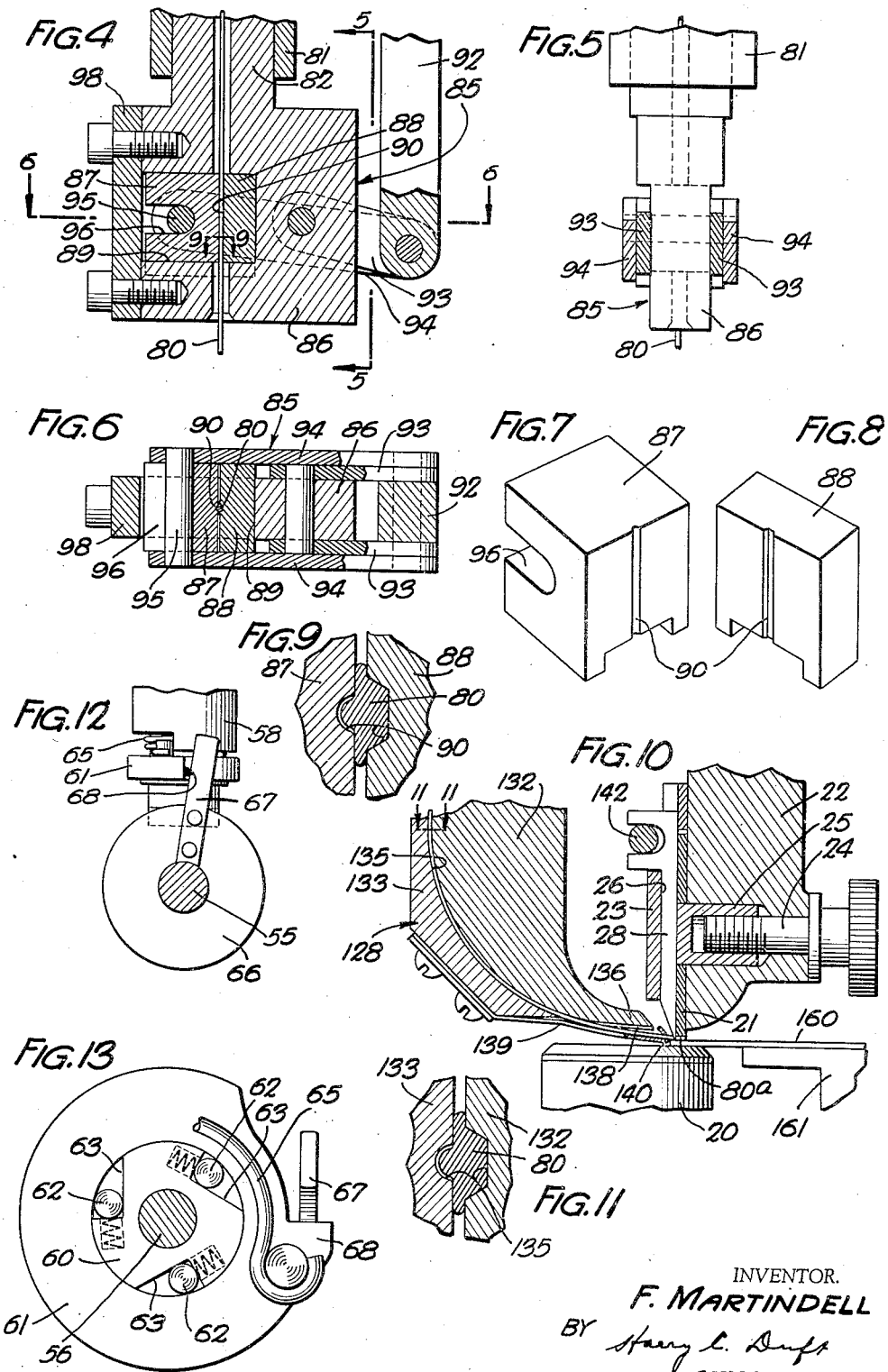

Patented Nov. 13, 1945

2,388,754

UNITED STATES PATENT OFFICE 2,388,754

MACHINE FOR WELDING

Frank Martindell, Western Springs, Ill., assignor to Western Electric Company, Incorporated, New York, N. Y., a corporation of New York Application July 10, 1942, Serial No. 450,409

8 Claims. (Cl. 219—4)

This invention relates to a machine for welding, and its object is to provide an improved machine for accurately and economically welding contacts to switch springs or other elements of electrical apparatus.

In accordance with one embodiment of the invention, a machine for electrically welding contacts to switch springs is provided, in which an end portion of an intermittently advanced continuous strip of contact metal is clamped to the switch spring by the welding electrodes, after which the end portion of the contact strip is severed from the strip and thereafter welded to the switch spring, after first retracting the continuous strip of contact metal from the severed portion to prevent diversion of the welding current through the continuous strip.

Other features and advantages of the invention will become apparent from the following detailed description taken in conjunction with the accompanying drawings, in which:

Fig. 4 is an enlarged vertical section of the contact strip feeding chuck;

Fig. 5 is a vertical section on line 5—5 of Fig. 4;

Fig. 6 is a horizontal section on line 6—6 of Fig. 4;

Figs. 7 and 8 are perspective views of the contact strip gripping and feeding jaws;

Fig. 9 is an enlarged fragmentary section on line 9—9 of Fig. 4;

Fig. 10 is an enlarged fragmentary vertical section similar to the lower portion of Fig. 2, but showing the upper electrode and the cutter in their operated positions;

Fig. 11 is an enlarged fragmentary section on line 11—11 of Fig. 10;

Fig. 12 is a fragmentary section on line 12—12 of Fig. 1, and

Fig. 13 is an enlarged fragmentary horizontal section on line 13—13 of Fig. 1.

Figure 1:
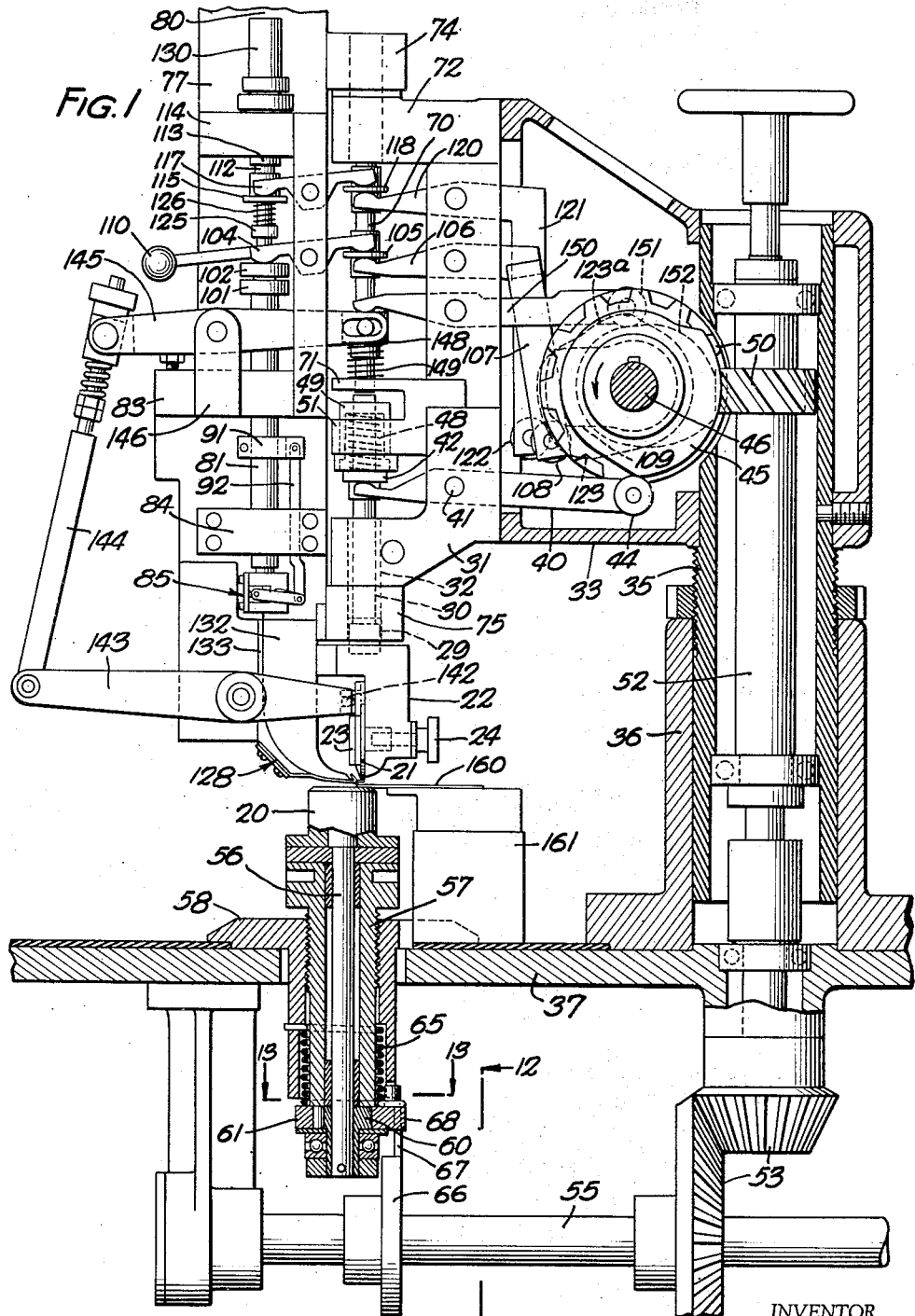
Fig. 1 is a fragmentary side view, partly in section, of a contact welding machine embodying the features of this invention.

Referring now to the drawings, and particularly to Fig. 1, the welding machine illustrated therein comprise a cylindrical lower welding electrode 20 and a circular upper welding electrode 21, the latter being vertically movable toward and away from the lower electrode. The upper electrode is clamped to an upper electrode supporting head 22 by means of a clamping block 23 (Fig. 2) and a cooperating clamping screw 24 threaded into an internally threaded tubular shank 25 of the clamping block. The block 23 is formed with a vertical channel 26 for slidably receiving a vertically reciprocable chisel-like cutter 28, the function of which is to sever the contacts from a continuous strip of contact material in the manner hereinafter described.

The upper electrode supporting head 22 is attached to a crosshead 29 at the lower end of a vertical bar 30, which is mounted for vertical movement in a vertical sleeve 32 supported in a bracket 31 attached to a gear housing 33 (Fig. 1). This gear housing is secured to the upper end of a tubular post 35, which is mounted for vertical adjustment in a tubular bracket 36 attached to a base plate 37 of the machine.

An upper electrode operating lever 40 is pivoted intermediate its ends upon a horizontal pivot pin 41 in the bracket 31. One end of this lever is adapted to engage the underside of a collar 42 fixed to the upper electrode supporting bar 30. The opposite end of the lever is equipped with a roller 44 for engaging a cam 45 fixed to a cam shaft 46 journalled in the gear housing. The cam operates through lever 40 to elevate or retract the upper electrode against the opposing force of a coil spring 48 (Fig. 2) on the upper end of electrode supporting bar 30. This spring is compressed between the upper side of collar 42 and a spring housing 49, the latter being vertically adjustable in a horizontal arm 51 of bracket 31 to adjust the tension of the spring.

The cam shaft 46 is driven through gears 50—50 (Fig. 1) by a vertical shaft 52, which, in turn, is driven through bevel gears 53—53 by a horizontal shaft 55 journalled underneath the base plate 37 of the machine. The gear ratios are such that for each complete revolution of the shaft 55, cam shaft 46 also makes one complete revolution.

The lower electrode 20 is attached to the upper end of a vertical shaft 56 (Fig. 1) which is rotatably journalled in a tubular bearing 57 mounted for vertical adjustment in the base plate 37. As shown in Fig. 1, the tubular bearing 57 is threaded in a flanged tubular bracket 58 attached to the base plate, so that by turning the bearing in the bracket, the bearing may be elevated or lowered to adjust the position of the lower electrode with respect to the upper electrode.

Mechanism is provided for indexing the lower electrode after each welding operation to present a cool portion of the electrode for each welding operation. This mechanism comprises a driven clutch member 60 (Figs. 1 and 13) attached to the lower electrode supporting shaft, and a driving clutch member 61 which surrounds the driven clutch member and is adapted to drive it in one direction only through three spring pressed rollers 62—62 disposed in peripheral notches 63, 63 in the driven clutch member. The construction is such that the driven clutch member is constrained to rotate with the driving clutch member when the latter is rotated in a clockwise direction (Fig. 13) against the opposing force of a torsion spring 65. When, however, the driving clutch member is rotated in a counter-clockwise direction under the force of the torsion spring, the driven clutch member remains stationary while the driving clutch member rotates around the clutch rollers 62. For imparting the required intermittent clockwise movement to the driving clutch member, there is provided on the driving shaft 55 a driving disk 66 having a driving finger 67 attached thereto and extending radially therefrom. This driving finger cooperates with a peripheral projection 68 on the driving disk to impart thereto a predetermined clockwise movement during each revolution of the driving shaft. This movement of the driving clutch member is transmitted through the clutch rollers 62 to the driven clutch member 60, whereby the lower electrode is rotated sufficiently to present a cool portion thereof for the next welding operation. After each indexing operation, the driving finger 67 slides by the projection 68 on the driving clutch member, whereupon the torsion spring 65 returns the driving clutch member to its original position.

A cylindrical rod 70 (Fig. 1) is mounted in a vertical position above the upper electrode supporting bar 30 and in axial alignment therewith. The lower end of this rod is fixed in a horizontal arm 71 of bracket 31 and its upper end extends through a bearing block 72 fixed to the gear housing 33. A bracket 74 is mounted on the upper end of rod 70 and a similar bracket 75 is mounted on the upper electrode guiding sleeve 32. To these two brackets there is attached a vertical plate 77 upon which is mounted the mechanism for feeding a continuous strip 80 of contact metal from a supply spool (not shown) to the welding electrodes.

The contact strip feeding mechanism comprises a tubular spindle 82 (Figs. 2 and 3), which is slidable in a vertical sleeve 81. The sleeve 81 is vertically slidable in guide blocks 83 and 84 secured to the mounting plate 77. The spindle 82 has a chuck 85 attached to its lower end. This chuck comprises a block 86 having a transverse slot 89 (Fig. 4) within which a pair of cooperating clamping jaws 87 and 88 are mounted, one of the jaws, 87, being horizontally slidable toward and away from the other jaw. The opposed faces of the two clamping jaws are grooved to provide a vertical guide passage 90 therebetween conforming to the cross section of the contact strip 80. When the clamping jaws are opened, they are free to slide along the contact strip as the chuck is elevated with the spindle 82 in the manner hereinafter described.

Figure 2:
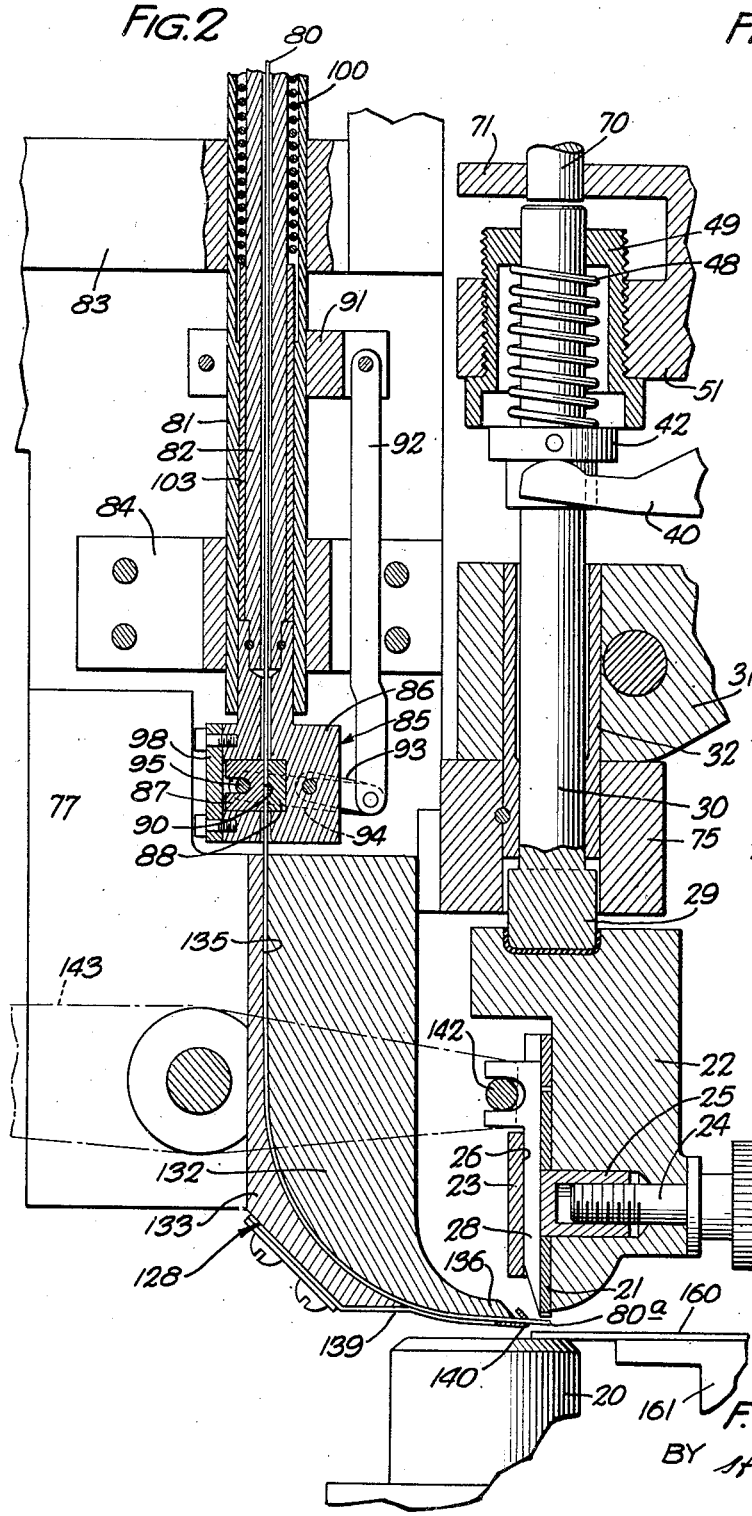
Figs. 2 and 3 are enlarged vertical sectional views of portions of the machine shown in Fig. 1.
Figure 3:
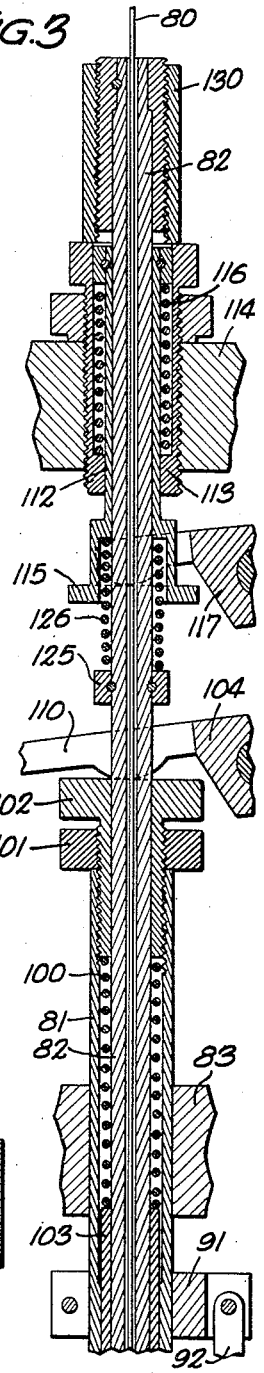

Clamped to the sleeve 81 above the bearing block 84 is a collar 91 to which the upper end of a vertical chuck actuating link 92 is pivotally connected. This link is pivotally connected at its lower end to the outer ends of two spaced pairs of toggle links, each pair comprising a short link 93 and a long link 94. The short links 93 are pivotally connected at their inner ends to the chuck block 86, while the long links 94 are pivotally connected to a pin 95 disposed in a slot 96 in the movable chuck jaw 87. The construction is such that when the toggle links are collapsed by downward movement of the toggle operating link 92, the movable chuck jaw 87 is free to move away from the other jaw 88 sufficiently to permit the two jaws to slide along the contact strip, but when the toggle links are straightened by upward movement of the toggle operating link, the movable jaw is moved toward the other jaw so that the contact strip is firmly gripped between the two jaws as shown in Figs. 2 and 4. A cover plate 98 is provided over the slot 89 in the chuck block for limiting the opening movement of the movable jaw of the chuck.

As mentioned above, the chuck closing link 92 is attached at its upper end to the collar 90 which is fixed to the sleeve 81. Thus, the link 92 is constrained to move with this sleeve which is urged upwardly on the feed spindle 82 by a coil spring 100 interposed between an adjustable extension 102 on the upper end of the sleeve and the upper end of a spacer sleeve 103 above the chuck block 86. By urging sleeve 81 upwardly, the spring 100 tends to straighten the toggle links 93 and 94 and thereby close the chuck jaws on the contact strip. For moving the chuck operating sleeve 81 downwardly against the opposing force of the spring to release the chuck jaws from the contact strip, there is provided a rock lever 104 which is pivoted intermediate its ends on the mounting plate 77. One end of this lever rests on a collar 105. This collar is slidable on the vertical rod 70 and rests on one end of a cam lever 106 which is pivoted intermediate its ends on the bracket 31. At its opposite end, the cam lever 106 has a depending leg 107 which carries a roller 108 adapted to ride on a cam 109 fixed to the cam shaft 46. This cam is designed to rock lever 104 so as to depress chuck operating sleeve 81 and thereby open the chuck jaws at the proper time during each operating cycle of the machine. A handle 110 is provided on the rock lever 104 for manually opening the chuck jaws when necessary; for example, when adjusting or setting up the machine.

The upper end of the contact strip feeding spindle 82 is slidable in a spring plunger sleeve 112 (Fig. 3) which, in turn, is slidable in an adjustable bushing 113 threaded in a supporting block 114 attached to the mounting plate 77. The plunger sleeve 112 has a flange 115 at its lower end which is pressed upwardly by a spring 116 against one end of a rock lever 117 which is pivoted intermediate its ends on the mounting plate 77 (Fig. 1). The opposite end of this rock lever rests on a collar 118 which is slidable on the vertical rod 70 and rests on one end of a cam lever 120. This cam lever is pivoted intermediate its ends on the bracket 31 and has a depending leg 121 which carries a roller 122 adapted to ride on a cam 123 fixed to the cam shaft 46. The cam is designed to rock the lever 117 so as to depress the plunger sleeve 112 at the proper time during each operating cycle of the machine. Interposed between the plunger sleeve and a collar 125 fixed to the strip feeding spindle is a spring 126 through which the downward movement of the plunger sleeve is transmitted to the strip feeding spindle, thereby advancing the previously gripped contact strip downwardly through a guide quill 128 which directs the contact strip toward the welding electrodes.

A stop sleeve 130 is threaded on the upper end of the strip feeding spindle 82 and is adapted to engage the flanged upper end of bushing 113 to limit the downward movement of the feed spindle. By simply turning this stop sleeve, it may be adjusted longitudinally of the feed spindle to vary the extent of downward movement of the feed spindle, whereby the length of contact strip advanced during each feeding cycle is predetermined. It will be understood that after the feed spindle has been depressed to its lowermost position against stop bushing 113, further downward movement of the plunger sleeve 112 is taken up by the spring 126.

The guide quill 128 is composed of two curved plates 132 and 133 attached to the mounting plate 77. The opposed surfaces of these plates are grooved to provide a contact strip guiding passage 135, the lower end of which curves toward the welding electrodes, as best shown in Figs. 2 and 10. Plate 132 is formed at its lower end with a horizontal extension 136 which projects beyond the lower end of plate 133 and is provided on its underside with a contact strip guiding groove 138 (Fig. 10) in alignment with the discharge end of the guide passage 135. The free end portion of the contact strip is yieldably held in the groove 138 by means of a flat spring 139 attached at one end to the plate 133. The free end of this spring is bent over and is provided with an aperture 140 for directing the end of the contact strip into a position immediately below the upper electrode, as shown in Fig. 2.

As mentioned above, the vertically reciprocable chisel-like cutter 28, which is mounted on the face of the upper electrode 21, serves to sever contacts from the end of the continuous strip of contact metal. This cutter is pivotally connected at 142 to one end of a lever 143 which is pivoted intermediate its ends on the mounting plate 77. The opposite end of lever 143 is connected by an adjustable link 144 (Fig. 1) to one end of a rock lever 145 which is pivoted intermediate its ends on a bracket 146 attached to block 83. The opposite end of this rock lever is pivotally connected to a collar 148 which is slidable on the rod 70. A spring 149 urges the collar upwardly against one end of a cam lever 150 which is pivoted intermediate its ends on the bracket 31. The opposite end of this cam lever carries a roller 151 adapted to ride on a cam 152 on cam shaft 46. The cam is designed to actuate the interconnected levers and links so as to operate the cutter 28 at the proper time during each cycle of operation of the machine.

In the operation of the machine, a switch spring 160, on which a contact is to be welded, is placed by the operator upon a suitable fixture 161, which positions the switch spring so that one end thereof extends above the lower welding electrode 20, as shown in Figs. 1 and 2. An operating cycle of the machine is then started by the operator by operatively connecting the shaft 55 with a suitable driving means (none shown) which includes conventional mechanism for stopping the machine automatically upon the completion of an operating cycle. The details of the driving mechanism and the means for supplying the welding current to the welding electrodes have been omitted, since they form no part of the present invention, and a detailed disclosure thereof is believed unnecessary to a complete understanding of the present invention. It is believed sufficient to state herein that during each operating cycle of the machine, shaft 55 and cam shaft 46 each make one, and only one, complete revolution and then stop automatically, and at the end of each operating cycle, the operated parts of the machine come to rest in the positions in which they are shown in Fig. 1.

At the beginning of each operating cycle of the machine, the finger 67 on driving disk 66 indexes the lower electrode 20 to move a cool portion thereof to the welding position, and the upper electrode elevating cam 45 permits spring 48 to move upper electrode 21 downwardly into clamping engagement with the previously advanced end portion 80a of the contact strip 80 projecting from the lower end of the guide plate 132, whereby the end portion of the contact strip and the end portion of the switch spring are clamped together between the upper and lower electrodes. Simultaneously therewith, the chuck opening cam 109 operates through levers 106 and 104 to depress chuck operating sleeve 81 on feed spindle 82. This downward movement of the chuck operating sleeve is transmitted through the link 92 (Fig. 2) to collapse the toggle links 93 and 94 and thereby release the chuck jaws 87 and 88 from gripping engagement with the contact strip. The feed spindle 82 is then elevated to an intermediate position by the spring pressed sleeve 112 (Fig. 3) under the control of the cam 123 (Fig. 1), which has a dwell portion 123a for holding the feed spindle in the intermediate position while the previously clamped end portion 80a of the contact strip is severed by a downward movement of the chisel-like cutter 28 under the control of cam 152.

The chuck opening cam 109 (Fig. 1) is designed to permit spring 100 (Figs. 2 and 3) to shift chuck operating sleeve 81 upwardly on the feed spindle and thereby close the chuck jaws into gripping engagement with the contact strip just prior to the cutting operation. Immediately after the cutting operation, the feed spindle 82 is elevated to its uppermost position by the spring pressed sleeve 112 under the control of the cam 123, whereby the previously gripped contact strip 80 is retracted from the previously severed end portion 80a thereof, so as to prevent the diversion of welding current through the continuous strip of contact metal during the welding operation, which is timed by suitable means (none shown) to take place immediately after the retraction of the continuous contact strip from the severed end portion thereof.

After the severed end portion of the contact strip has been welded to the switch spring, the upper electrode 21 is elevated or retracted by the cam 45 and simultaneously therewith the contact strip feeding spindle 82 is moved downwardly by cam 123 to advance a fresh end portion of the contact strip into position below the retracted upper electrode, thus completing an operating cycle of the machine, which may be repeated by again connecting the shaft 55 with the driving means.

It is to be understood that the invention is not limited to the particular embodiments thereof herein illustrated and described, but is capable of other applications within the scope of the appended claims.

What is claimed is:

1. In a machine for welding a piece of metal to an article, means comprising a movable member for clamping a portion of a strip of metal to the article, and a reciprocatory cutter mounted on said member for severing the clamped portion of the metal strip from the remaining strip.

2. In a machine for welding a piece of contact metal to an article, means for clamping an end portion of a continuous strip of contact metal to a surface of the article, and a reciprocatory cutter adapted to operate against said surface of the article to sever the clamped end portion of contact metal from the continuous strip.

3. In a machine for electrically welding a piece of contact metal to a switch spring, means comprising a movable member for clamping an end portion of a continuous strip of contact metal to a surface of the switch spring, a reciprocating cutter mounted on said member for operating against said surface of the switch spring to sever the clamped end portion from the continuous strip, and means for operating said cutter in timed relation with the movement of said clamping member.

4. In a machine for electrically welding a piece of contact metal to a switch spring, means for clamping an end portion of a continuous strip of contact metal to the switch spring, means for severing the clamped end portion from the continuous strip, and means for retracting the continuous strip from the clamped severed portion.

5. In a machine for welding a contact to a switch spring, a pair of welding electrodes, one of which is movable relative to the other, means for advancing a continuous strip of contact metal toward said electrodes, means for moving the movable electrode toward the other electrode to clamp an end portion of the continuous strip to a switch spring interposed between said electrodes, and a reciprocatory cutter mounted on the movable electrode for severing the clamped end portion of the contact metal from the continuous strip.

6. In a machine for welding a contact to a switch spring, a pair of welding electrodes, one of which is movable relative to the other, means for advancing a continuous strip of contact metal toward said electrodes, means for moving the movable electrode toward the other electrode to clamp an end portion of the continuous strip to a switch spring interposed between said electrodes, means movably mounted on the movable electrode for severing the clamped end portion from the continuous strip, means for thereafter retracting the continuous strip, means for energizing the welding electrodes to weld the severed end portion of the continuous strip to a switch spring, and means for operating said energizing means and retracting means in timed relation.

7. In a machine for welding a contact to a switch spring, a pair of welding electrodes, one of which is movable relative to the other, means for intermittently advancing a continuous strip of contact metal to insert an end portion thereof between said electrodes, means for moving the movable electrode toward the other electrode to clamp the said end portion of the metal strip to a switch spring interposed between said electrodes, means for thereafter severing the said end portion from the continuous strip, means for retracting the continuous strip from said severed end portion to prevent diversion of welding current through said continuous strip, and means comprising a shaft and a series of cams on said shaft for controlling the operation of the several aforementioned means.

8. In a machine for welding a contact to a switch spring, a pair of welding electrodes, one of which is movable relative to the other, a reciprocatory feed spindle having a releasable chuck for intermittently advancing a continuous strip of contact metal to insert an end portion thereof between said electrodes, means for moving the movable electrode toward the other electrode to clamp the said end portion of the metal strip to a switch spring inserted between said electrodes, means for releasing the chuck, means for retracting the feed spindle with its chuck released to an intermediate position while the said end portion of the metal strip is clamped to the switch spring, means for thereafter severing the said end portion from the continuous strip, and means for thereafter operating the feed spindle to retract the continuous strip from the severed end portion thereof.

FRANK MARTINDELL.